US010997027B2

(12) United States Patent
Didehban et al.

(10) Patent No.: US 10,997,027 B2
(45) Date of Patent: May 4, 2021

(54) LIGHTWEIGHT CHECKPOINT TECHNIQUE FOR RESILIENCE AGAINST SOFT ERRORS

(71) Applicants: Moslem Didehban, Tempe, AZ (US); Sai Ram Dheeraj Lokam, Chandler, AZ (US); Aviral Shrivastava, Phoenix, AZ (US)

(72) Inventors: Moslem Didehban, Tempe, AZ (US); Sai Ram Dheeraj Lokam, Chandler, AZ (US); Aviral Shrivastava, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 230 days.

(21) Appl. No.: 16/227,514

(22) Filed: Dec. 20, 2018

(65) Prior Publication Data

US 2019/0196912 A1 Jun. 27, 2019

Related U.S. Application Data

(60) Provisional application No. 62/609,100, filed on Dec. 21, 2017.

(51) Int. Cl.
*G06F 11/00* (2006.01)
*G06F 11/14* (2006.01)
(Continued)

(52) U.S. Cl.
CPC ........ *G06F 11/1407* (2013.01); *G06F 9/3863* (2013.01); *G06F 11/0793* (2013.01);
(Continued)

(58) Field of Classification Search
CPC .. G06F 11/1407; G06F 9/3861; G06F 9/3863; G06F 9/30116; G06F 11/1402;
(Continued)

(56) References Cited

U.S. PATENT DOCUMENTS 8,234,489 B2 * 7/2012 Williamson ........ G06F 9/30087
713/100
8,769,498 B2 * 7/2014 Burghard ................ G06F 8/437
717/125

(Continued)

OTHER PUBLICATIONS

U.S. Appl. No. 16/172,254.
(Continued)

*Primary Examiner* — Loan L. T. Truong
(74) *Attorney, Agent, or Firm* — Withrow & Terranova, P.L.L.C.

(57) ABSTRACT

Systems and methods for implementing a lightweight checkpoint technique for resilience against soft errors are disclosed. The technique provides effective, safe, and timely soft error detection and recovery using software. In an exemplary aspect, resilience against data flow errors and control flow errors is provided in critical or mixed-critical applications in each basic block or at critical basic blocks. Verified register preservation is provided at each basic block, along with memory preservation checkpoints. In this manner, soft errors are quickly detected and addressed. The register and memory preservation further allows for safe re-execution from recoverable soft errors. Control flow errors can also be detected at the beginning and/or end of each basic block.

12 Claims, 8 Drawing Sheets

(51) Int. Cl.
*G06F 9/38* (2018.01)
*G06F 11/07* (2006.01)

(52) U.S. Cl.
CPC ...... *G06F 11/1458* (2013.01); *G06F 11/1471* (2013.01); *G06F 2201/84* (2013.01)

(58) Field of Classification Search
CPC .......... G06F 11/1446; G06F 11/1469; G06F 11/0793; G06F 11/00; G06F 2212/452; G06F 9/3842
See application file for complete search history.

(56) References Cited

U.S. PATENT DOCUMENTS

| | | | | |
|---|---|---|---|---|
| 8,966,455 | B2* | 2/2015 | Abadi | G06F 8/433 |
| | | | | 717/133 |
| 9,015,689 | B2 | 4/2015 | Bai et al. | |
| 9,513,886 | B2 | 12/2016 | Bai et al. | |
| 10,296,312 | B2 | 5/2019 | Shrivastava et al. | |
| 10,437,256 | B2 | 10/2019 | Andert et al. | |
| 2006/0026343 | A1* | 2/2006 | Wu | G06F 3/0611 |
| | | | | 711/112 |
| 2006/0179207 | A1* | 8/2006 | Eisen | G06F 9/3851 |
| | | | | 711/100 |
| 2006/0179346 | A1* | 8/2006 | Bishop | G06F 11/1407 |
| | | | | 714/13 |
| 2010/0042875 | A1* | 2/2010 | Grodnik | G06F 11/3636 |
| | | | | 714/38.14 |
| 2010/0077164 | A1* | 3/2010 | Stiffler | G06F 11/1438 |
| | | | | 711/162 |
| 2010/0231944 | A1* | 9/2010 | Takahashi | G06F 3/1213 |
| | | | | 358/1.13 |
| 2011/0016338 | A1* | 1/2011 | Williamson | G06F 9/3013 |
| | | | | 713/323 |
| 2011/0107166 | A1* | 5/2011 | Flautner | G06F 11/0736 |
| | | | | 714/746 |
| 2012/0005461 | A1* | 1/2012 | Moir | G06F 9/3863 |
| | | | | 712/228 |
| 2012/0221884 | A1* | 8/2012 | Carter | G06F 11/0793 |
| | | | | 714/2 |
| 2013/0031364 | A1* | 1/2013 | Glew | G06F 21/52 |
| | | | | 713/162 |
| 2013/0103989 | A1* | 4/2013 | Jensen | G06F 11/0793 |
| | | | | 714/47.2 |
| 2013/0205413 | A1* | 8/2013 | Grocutt | G06F 21/52 |
| | | | | 726/30 |
| 2013/0275806 | A1* | 10/2013 | Busaba | G06F 11/0781 |
| | | | | 714/16 |
| 2014/0189310 | A1* | 7/2014 | Tuck | G06F 11/0721 |
| | | | | 712/209 |
| 2015/0007142 | A1* | 1/2015 | Biffle | G06F 21/54 |
| | | | | 717/126 |
| 2015/0186251 | A1* | 7/2015 | Friedler | G06F 11/3672 |
| | | | | 717/124 |
| 2015/0213260 | A1* | 7/2015 | Park | G06F 12/14 |
| | | | | 726/23 |
| 2016/0092225 | A1* | 3/2016 | Collura | G06F 9/3857 |
| | | | | 712/228 |
| 2016/0170725 | A1 | 6/2016 | Holton et al. | |
| 2016/0246602 | A1 | 8/2016 | Radhika et al. | |
| 2017/0235580 | A1* | 8/2017 | Knauth | G06F 11/1469 |
| | | | | 712/11 |
| 2018/0004946 | A1* | 1/2018 | LeMay | G06F 21/554 |
| 2019/0073225 | A1* | 3/2019 | Mace | G06F 9/3851 |
| 2019/0378542 | A1 | 12/2019 | Didehban et al. | |

OTHER PUBLICATIONS

U.S. Appl. No. 16/420,364.
U.S. Appl. No. 16/568,074.
U.S. Appl. No. 16/694,451.

Bell, Gordon, et al., "Characterization of Silent Stores," International Conference on Parallel Architectures and Compilation Techniques, Oct. 2000, IEEE, pp. 133-142.
Feng, Shugang, et al., "Shoestring: Probabilistic Soft Error Reliability on the Cheap," Architectural Support for Programming Languages and Operating Systems, Mar. 13-17, 2000, Pittsburgh, Pennsylvania, ACM, 12 pages.
Kuvaiskii, Dmitrii, et al., "ELZAR: Triple Modular Redundancy using Intel AVX," Practical Experience Report, International Conference on Dependable Systems and Networks, Jun. 2016, IEEE, pp. 646-653.
Laguna, Ignacio, et al., "IPAS: Intelligent Protection Against Silent Output Corruption in Scientific Applications," In CGO, Mar. 2016, ACM, pp. 227-238.
Liu, Qingrui, et al., "Compiler-Directed Lightweight Checkpointing for Fine-Grained Guaranteed Soft Error Recovery," International Conference for High Performance Computing, Networking, Storage and Analysis, Nov. 2016, IEEE, 12 pages.
Restrepo-Calle, Felipe, et al., "Selective SWIFT-R," Journal of Electronic Testing, vol. 29, Issue 6, Dec. 2013, 15 pages.
Vemu, Ramtilak, et al., "CEDA: Control-Flow Error Detection Using Assertions," IEEE Transactions on Computers, vol. 60, Issue 9, Sep. 2011, pp. 1233-1245.
Zhang, Yun, et al., "DAFT: Decoupled Acyclic Fault Tolerance," Proceedings of the International Conference on Parallel Architectures and Compilation Techniques, Sep. 11-15, 2010, Vienna, Austria, ACM, 11 pages.
Author Unknown, "International Technology Roadmap for Semiconductors 2.0," Executive Summary, 2015, ITRS, 79 pages.
Aupy, Guillame, et al., "On the Combination of Silent Error Detection and Checkpointing," Pacific Rim International Symposium on Dependable Computing, Dec. 2013, IEEE, 10 pages.
Barhorst, James, et al., "A Research Agenda for Mixed-Criticality Systems," Cyber-Physical Systems, Apr. 2009, 26 pages.
Blinkert, Nathan, et al., "The gem5 simulator," ACM SIGARCH Computer Architecture News, vol. 39, Issue 2, May 2011, 7 pages.
Chang, Jonathan, et al., "Automatic Instruction-Level Software-Only Recovery," International Conference on Dependable Systems and Networks, Jun. 2006, IEEE, 10 pages.
Didehban, Moslem, et al., "A Compiler technique for near Zero Silent Data Corruption," Design Automotion Conference, vol. 53, Jun. 2016, ACM, 7 pages.
Dong, Xiangyu, et al., "A Case Study of Incremental and Background Hybrid In-Memory Checkpointing," Exascale Evaluation and Research Techniques Workshop, vol. 115, Mar. 2010, 8 pages.
Duell, Jason. "The Design and Implementation of Berkeley Lab's Linux Checkpoint/Restart," Lab Technical Report, Lawrence Berkeley National Laboratory, Apr. 2005, 17 pages.
Elnozahy, Elmootazbellah, et al., "Checkpointing for Peta-Scale Systems: A Look into the Future of Practical Rollback-Recovery," IEEE Transactions on Dependable and Secure Computing, vol. 1, Issue 2, Apr. 2004, pp. 97-108.
Feng, Shugang, et al., "Encore: Low-Cost, Fine-Grained Transient Fault Recovery," International Symposium on Microarchitecture, Dec. 2011, IEEE, 12 pages.
Guthaus, Matthew, et al., "MiBench: A free, commercially representative embedded benchmark suite," International Workshop on Workload Characterization, Dec. 2001, IEEE, 12 pages.
Lattner, Chris, et al., "LLVM: A Compilation Framework for Lifelong Program Analysis & Transformation," International Symposium on Code Generation and Optimization, Mar. 2004, 11 pages.
Leveugle, Regis, et al., "Statistical Fault Injection: Quantified Error and Confidence," Design, Automation & Test in Europe Conference & Exhibition, Apr. 2009, IEEE, 5 pages.
Liu, Qingrui, et al., "Clover: Compiler Directed Lightweight Soft Error Resilience," Conference on Languages, Compilers and Tools for Embedded Systems, Jun. 2015, ACM, 10 pages.
Lu, Guoming, et al., "When is Multi-version Checkpointing Needed?," 3rd Workshop on Fault-Tolerance for HPC at Extreme Scale, Jun. 2013, ACM, 8 pages.
Mitropoulou, Konstantina, et al., "DRIFT: Decoupled CompileR-Based Instruction-Level Fault-Tolerance," International Workshop

(56) References Cited

OTHER PUBLICATIONS on Languages and Compilers for Parallel Computing, Oct. 2014, Springer International Publishing , 17 pages.

Oh, Nahmsuk, et al. "ED4I: Error Detection by Diverse Data and Duplicated Instructions," IEEE Transactions on Computers, vol. 51, Issue 2, Feb. 2002, pp. 180-199.

Quinn, Heather, et al., "Software Resilience and the Effectiveness of Software Mitigation in Microcontrollers," IEEE Transactions on Nuclear Science, vol. 62, Issue 6, Dec. 2015, pp. 2532-2538.

Reis, George, et al., "SWIFT: Software Implemented Fault Tolerance," International Symposium on Code Generation and Optimization, Mar. 2005, IEEE, 12 pages.

Reis, George, et al., "Automatic instruction-level software-only recovery," MICRO, vol. 27, Issue 1, Jan. 2007, IEEE, pp. 36-47.

Schirmeier, Horst, et al., "Avoiding Pitfalls in Fault-Injection Based Comparison of Program Susceptibility to Soft Errors," International Conference on Dependable Systems and Networks, 2015, IEEE, pp. 319-330.

Schroeder, Bianca, et al., "Understanding Failures in Petascale Computers," Journal of Physics, Conference Series, vol. 78, 2007, IOP Publishing Ltd, 11 pages.

Shrivastava, Aviral, et al., "Quantitative Analysis of Control Flow Checking Mechanisms for Soft Errors," Design Automation Conference, Jun. 2014, IEEE, 6 pages.

Shye, et al., "PLR: A Software Approach to Transient Fault Tolerance for Multicore Architectures," IEEE Transactions on Dependable and Secure Computing, vol. 6, Issue 2, Apr. 2009, pp. 135-148.

Sierawski, Brian, et al., "Effects of Scaling on Muon-Induced Soft Errors," International Reliability Physics Symposium, Apr. 2011, IEEE, 6 pages.

Silberberg, Rein, et al., "Neutron Generated Single-Event Upsets in the Atmosphere," IEEE Transactions on Nuclear Science, vol. NS-31, Issue 6, Dec. 1984, pp. 1183-1185.

Spainhower, L., et al., "IBM S/390: Parallel Enterprise Server G5 fault tolerance: A historical perspective," Journal of Research and Development, vol. 43, Issue 5.6, Sep. 1999, IBM, 8 pages.

Taber, A., et al., "Single Event Upset in Avionics," Transactions on Nuclear Science, vol. 40, Issue 2, Apr. 1993, IEEE, pp. 120-126.

Ulbrich, et al., "Eliminating Single Points of Failure in Software-Based Redundancy," Ninth European Dependable Computing Conference, 2012, IEEE, pp. 49-60.

Wang, et al., "Compiler-Managed Software-based Redundant Multi-Threading for Transient Fault Detection," International Symposium on Code Generation and Optimization, 2007, IEEE, 13 pages.

Xu, Jianjun, et al., "An Instruction-level Fine-grained Recovery Approach for Soft Errors," Symposium on Applied Computing, Mar. 2013, ACM, pp. 1511-1516.

Yim, Keun Soo, et al., "A Fault-Tolerant Programmable Voter for Software-Based N-Modular Redundancy," IEEE Aerospace Conference, 2012, IEEE, 20 pages.

Yu, Jing, et al., "ESoftcheck: Removal of Non-vital Checks for Fault Tolerance," , International Symposium on Code Generation and Optimization, Mar. 2009, IEEE, 12 pages.

Zhang, Yun, et al., "Runtime Asynchronous Fault Tolerance via Speculation," International Symposium on Code Generation and Optimization, Mar. 2012, ACM, 10 pages.

Zhang, Ying, et al., "Fault Recovery Based on Checkpointing for Hard Real-Time Embedded Systems," International Symposium on Defect and Fault Tolerance in VLSI Systems, 2003, IEEE, 8 pages.

\* cited by examiner

LIGHTWEIGHT CHECKPOINT TECHNIQUE FOR RESILIENCE AGAINST SOFT ERRORS

RELATED APPLICATIONS

This application claims the benefit of provisional patent application Ser. No. 62/609,100, filed Dec. 21, 2017, the disclosure of which is hereby incorporated herein by reference in its entirety.

GOVERNMENT SUPPORT

This invention was made with government support under 1055094 awarded by the National Science Foundation. The government has certain rights in the invention.

FIELD OF THE DISCLOSURE

This disclosure relates to error reduction in digital circuits. In particular, this disclosure presents systems and methods of correcting for transient faults in microprocessor-based devices which may be implemented on various hardware.

BACKGROUND

Soft errors or transient faults—caused by high energy particles that lead to an unexpected change in the transistor logic—have long been considered as the main reliability challenge for mission-critical applications, such as aviation. However, aggressive sub-nano transistor scaling (10 nm-7 nm) and near-threshold supply voltage are making modern digital circuits that we use in our everyday lives ever more susceptible to external noises. Now, even low-energy terrestrial particles like muons can cause soft errors. In fact, muon-induced soft errors are a major reliability challenge in both near-term and long-term microprocessor designs. Therefore soft error resilience is a must—even for safety-critical terrestrial applications.

Conventionally, hardware level soft-error resilience techniques have been employed in mission- and safety-critical systems, like spacecraft and enterprise systems. However, hardware solutions come with high costs owing to the need to redesign the system. Software approaches are attractive, as they can provide flexible and affordable solutions. They can be especially useful for mixed-critical systems, where flexible software techniques can provide reliability based on task requirements. For instance, in automobile applications where safety-critical tasks (e.g., braking) and non-critical tasks (e.g., entertainment systems) share an underlying microprocessor, software techniques are preferable as they can meet high-reliability requirements for critical tasks, while non-critical tasks get the best performance from the underlying microprocessor. Although existing software techniques can meet the reliability requirements for medium- and less-critical tasks, they do not provide high error resiliency (e.g., error detection and recovery) demanded by high-critical tasks.

An ideal error resilient scheme should provide complete, effective and timely recovery from soft errors. Some software-level fault tolerance techniques are incomplete, because they provide error detection and assume some sort of checkpoint/roll-back for recovery. Restarting an application from beginning is the simplest rollback recovery strategy. However, restarting is not applicable in many cases, such as long running, real-time and interactive applications. In addition, restarting is accompanied by high error recovery latency—expected recovery latency can be half of the application execution time. These problems can be alleviated by building full-system checkpoints (preserving the whole memory and register stats) during the execution of an application. However, to solve the problem of latent errors (errors which may happen before checkpointing and will be detected after checkpointing) frequent checkpoints are required, which impose unacceptable performance overhead on the system.

Software forward-recovery techniques which execute three versions of computations and perform majority-voting between the results can potentially solve the problem of latent errors in a more efficient way than frequent full system checkpointing. The recovery latency of voting-based techniques is small (~10 machine instructions), but they cannot provide reliability demanded by high-critical applications mainly due to considerable single-points-of-failure introduced by voting. Moreover, coarse-grained forward-recovery schemes demand more than three times the memory overhead. However, since the memory subsystems are usually error-correcting-code (ECC) protected in many modern microprocessors, applying redundancy to memory is wasteful.

In-application fault tolerant techniques can potentially eliminate the need for full-system checkpointing and memory replication, while providing efficient and timely error handling by combining both error detection and recovery within the application itself. Unfortunately, existing in-application error tolerant schemes are significantly weaker than their underlying detection schemes, due to the vulnerability added by complex error recovery routines. In fact, some error tolerant schemes increase vulnerability over systems without the error tolerant schemes.

SUMMARY

Systems and methods for implementing a lightweight checkpoint technique for resilience against soft errors are disclosed. The technique provides effective, safe, and timely soft error detection and recovery using software. In an exemplary aspect, resilience against data flow errors and control flow errors is provided in critical or mixed-critical applications in each basic block or at critical basic blocks. Verified register preservation is provided at each basic block, along with memory preservation checkpoints. In this manner, soft errors are quickly detected and addressed. The register and memory preservation further allows for safe re-execution from recoverable soft errors. Control flow errors can also be detected at the beginning and/or end of each basic block.

Aspects of the disclosure relate to providing a software checkpoint and recovery technique (also referred to herein as InCheck) for complete, safe & timely recovery from soft errors. InCheck makes light-weight error-free checkpoints at basic block granularity, and safely reverts the application execution to the beginning of a last executed basic block using preserved checkpoints. Features of InCheck include verified register file preservation, single memory-location checkpointing, and safe and timely recovery. In this regard, with verified register file preservation, InCheck preserves registers' value into memory and ensures that the preservation was correctly performed. With single-memory location checkpointing, InCheck temporarily preserves the state of each memory location before the corresponding write to that location, rather than checkpointing an entire memory state. With safe and timely recovery, InCheck invokes a diagnosis routine which allows recovery only when it is safe instead of performing recovery regardless of the error propagation scope. The recovery latency of InCheck is negligible as it involves re-execution of just one basic block's instructions apart from diagnosis and recovery routines.

An exemplary aspect provides a method of detecting and recovering from soft errors of a processing device. The method includes storing an initial state of a first register at a preservation memory address. The method also includes executing an instruction block comprising a store instruction at a target memory address. Prior to executing the store instruction, the method includes preserving backup data stored in the target memory address in a memory backup register. After preserving the backup data, the method also includes storing result data from the instruction block at the target memory address. The method also includes detecting an error in the result data and, in response to detecting the error, recovering from the error.

Another exemplary aspect provides a method of compiling a critical instruction block. The method includes inserting a first store instruction before the critical instruction block to store an initial state of a first register at a preservation memory address. The method also includes identifying a second store instruction to a target memory address. The method also includes inserting a first load instruction prior to the second store instruction to load backup data stored in the target memory address to a memory backup register. The method also includes inserting an error detection block after the second store instruction to check for an error in the second store instruction to the target memory address.

Another exemplary aspect provides a non-transitory computer-readable medium. The non-transitory computer-readable medium is configured to adapt a processing device to store an initial state of a first register at a preservation memory address and execute an instruction block comprising a store instruction at a target memory address. Prior to executing the store instruction, the processing device is further adapted to preserve backup data stored in the target memory address in a memory backup register. After preserving the backup data, the processing device is further adapted to store result data from the instruction block at the target memory address and check for an error in the result data stored at the target memory address.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
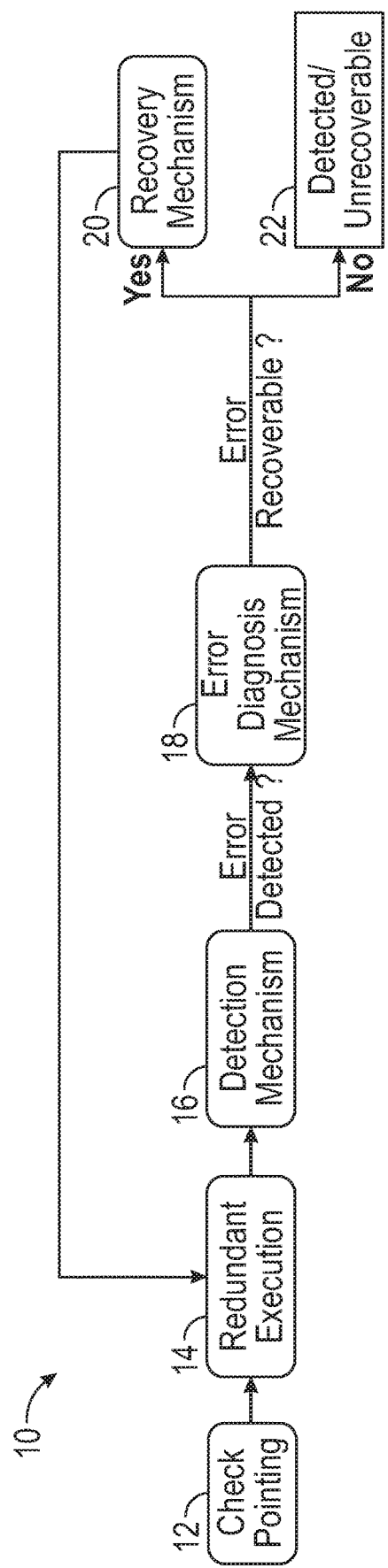
FIG. 1 is a schematic view of an exemplary checkpoint and recovery technique (also referred to herein as InCheck) for resilience against soft errors.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Systems and methods for implementing a lightweight checkpoint technique for resilience against soft errors are disclosed. The technique provides effective, safe, and timely soft error detection and recovery using software. In an exemplary aspect, resilience against data flow errors and control flow errors is provided in critical or mixed-critical applications in each basic block or at critical basic blocks. Verified register preservation is provided at each basic block, along with memory preservation checkpoints. In this manner, soft errors are quickly detected and addressed. The register and memory preservation further allows for safe re-execution from recoverable soft errors. Control flow errors can also be detected at the beginning and/or end of each basic block.

Aspects of the disclosure relate to providing a software checkpoint and recovery technique (also referred to herein as InCheck) for complete, safe & timely recovery from soft errors. InCheck makes light-weight error-free checkpoints at basic block granularity, and safely reverts the application execution to the beginning of a last executed basic block using preserved checkpoints. Features of InCheck include verified register file preservation, single memory-location checkpointing, and safe and timely recovery. In this regard, with verified register file preservation, InCheck preserves registers' value into memory and ensures that the preservation was correctly performed. With single-memory location checkpointing, InCheck temporarily preserves the state of each memory location before the corresponding write to that location, rather than checkpointing an entire memory state. With safe and timely recovery, InCheck invokes a diagnosis routine which allows recovery only when it is safe instead of performing recovery regardless of the error propagation scope. The recovery latency of InCheck is negligible as it involves re-execution of just one basic block's instructions apart from diagnosis and recovery routines.

FIG. 1 is a schematic view of an exemplary checkpoint and recovery technique (also referred to herein as InCheck 10) for resilience against soft errors. It may be desirable to protect some or all of an application or routine. Thus, for each basic instruction block which is desired to be protected (e.g., each critical instruction block), InCheck 10 includes a checkpointing 12 to preserve registers and/or memory which may be affected by the basic instruction block. The checkpointing 12 may preserve any register and/or memory location which is written to and/or read from during execution of the basic instruction block. The checkpointing 12 is further described below with respect to FIGS. 3, 4A, and 5-7.

After the checkpointing 12, InCheck 10 also includes a redundant execution 14 of instructions, which may include providing a main instruction thread and one or more shadow instruction threads. The redundant execution 14 is further described below with respect to FIGS. 2A and 2B. An error detection mechanism 16 is also included to detect silent data corruptions (SDCs) using results of the redundant execution 14. In an exemplary aspect, the error detection mechanism 16 incorporates at least some aspects of near Zero silent Data Corruption (nZDC) as described in Didehban et. al. nZDC: "A compiler technique for near Zero silent Data Corruption." In *DAC*-53. ACM, 2016, which is incorporated herein by reference in its entirety.

One of the features of InCheck 10 that distinguishes it from traditional techniques is its error diagnosis mechanism 18 for safe recovery. Generally, if an error affects the redundant execution 14 or instructions of the error detection mechanism 16 the error is recoverable. However, if the error impacts the execution of a store instruction in such a way that the effective memory address gets modified, the error is considered as unrecoverable (e.g., since the data will be written into an unknown and/or unpreserved memory location). Accordingly, the error diagnosis mechanism 18 determines whether a detected error is recoverable. If the error is recoverable, a recovery mechanism 20 restores the preserved registers and/or memory and returns to the redundant execution 14 of the basic instruction block. If the error is unrecoverable, a routine for detected and unrecoverable errors 22 is invoked. The routine for detected and unrecoverable errors 22 can include flagging an unrecoverable error (e.g., in an unrecoverable error register), terminating and/or re-starting the application, returning to an earlier point in the application (e.g., where a full register and/or memory preservation occurred), a further recovery routine, and so on. The error diagnosis mechanism 18, recovery mechanism 20, and routine for detected and unrecoverable errors 22 are further described below with respect to FIGS. 4A-7.

It should be understood that InCheck 10 can be used to provide resilience against soft errors in any critical application or critical portion of an application. As described further below, InCheck 10 can be invoked at the granularity of a basic instruction block of an application, providing high reliability for critical tasks while non-critical tasks can achieve the best performance from device hardware. In addition, InCheck 10 can be applied to an application through an appropriate technique. In some examples, InCheck 10 may be applied in a compiler, with critical tasks (e.g., critical basic instruction blocks) being identified by the code being compiled or by a dynamic determination of the compiler or another application. In other examples, InCheck 10 may be invoked at application runtime or through transformation of a compiled application.

Figure 2A:
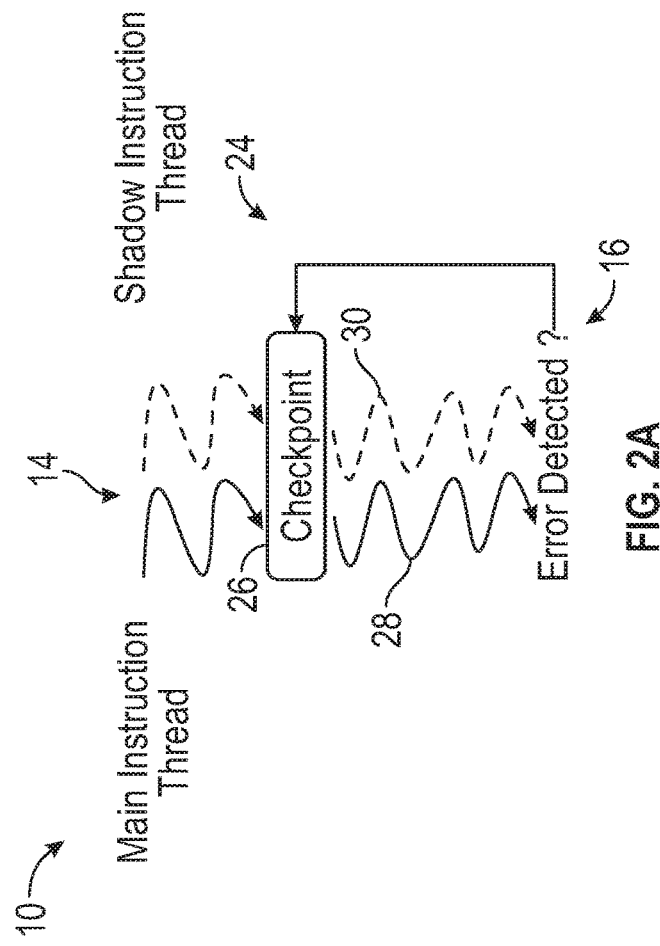
FIG. 2A is a schematic view of an exemplary error detection mechanism in an application using redundant execution.

FIG. 2A is a schematic view of an exemplary error detection mechanism 16 in an application 24 using the redundant execution 14. The error detection mechanism 16 is deployed with a checkpointing and rollback strategy (e.g., as described above with respect to FIG. 1). In this regard, at one or more points, the application 24 is paused to make a checkpoint 26 (a snapshot of some or all of an application state, such as memory and register values) into a safe storage. If the error detection mechanism 16 finds an error, execution of the application 24 can be resumed from the latest checkpoint 26.

Applying full system checkpointing and rollback as error recovery would not be efficient due to: 1) significant recovery latency (e.g., millions or billions of instructions depending on the checkpointing interval), 2) unacceptable performance overhead (frequent checkpointing required for latent error recovery), and 3) unacceptable memory overhead (which can range up to 1 gigabytes per checkpoint). InCheck 10 reduces latency, performance overhead, and memory overhead by providing a light-weight error-free checkpoint 26 at a fine granularity.

For example, the checkpoint 26 may be created at small portions of the application 24, such as each basic instruction block (or basic instruction blocks identified as critical to the application 24). Thus, the recovery latency of recovery is smaller (and may be negligible) as it generally involves re-execution of just that small portion of the application 24. With the checkpoint 26 created, the instructions of the application 24 are duplicated to form a main instruction thread 28, which uses a main set of registers, and a redundant shadow instruction thread 30, which uses a shadow set of registers. In this regard, the error detection mechanism 16 can compare results of the main instruction thread 28 and the shadow instruction thread 30 to determine whether an SDC has occurred during execution of the small portion of the application 24. If an error is detected, the application state preserved at the checkpoint 26 can be safely restored and execution of the application 24 can return to the checkpoint 26.

Figures 2B, 3:
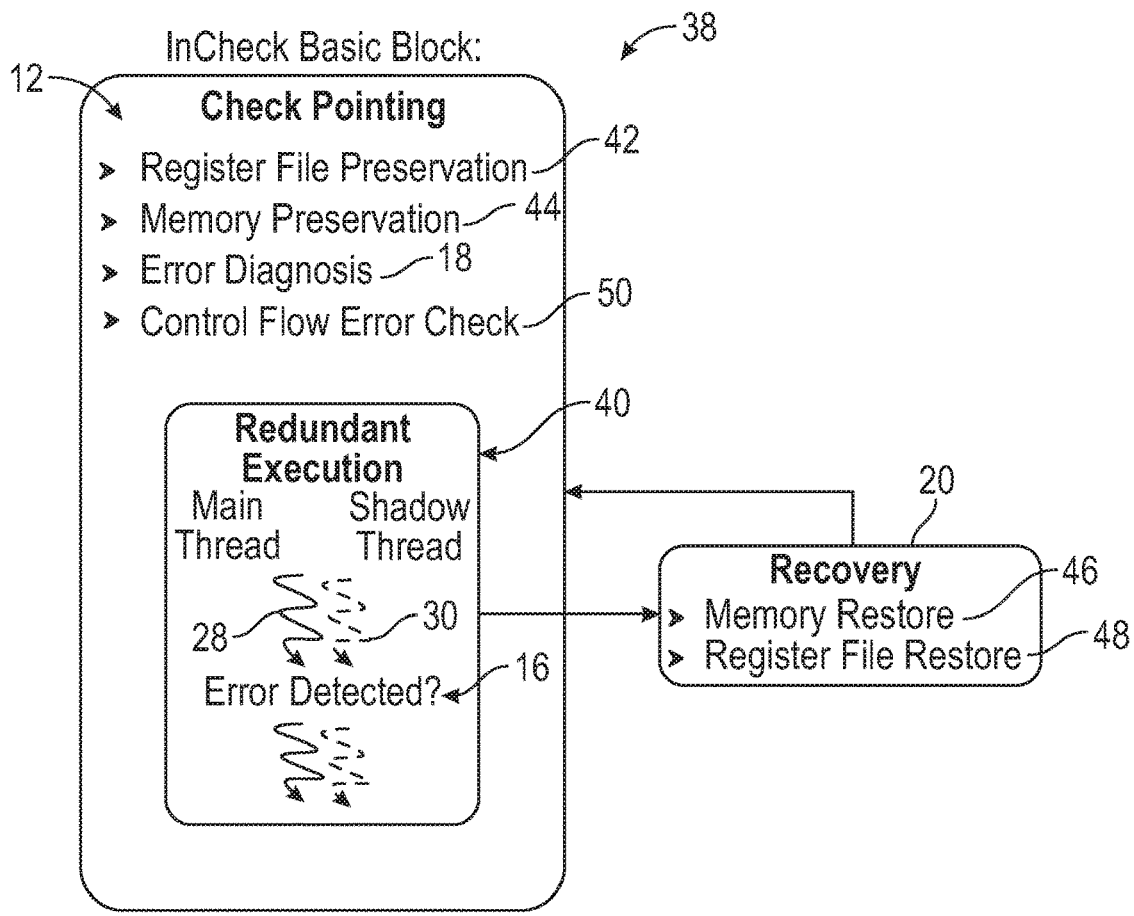
FIG. 2B illustrates an implementation of the error detection mechanism of FIG. 2A, transforming unreliable code to include a main instruction thread, a redundant shadow instruction thread, and error detection.
FIG. 3 is a schematic view of an exemplary basic instruction block incorporating the error detection scheme of FIG. 2A, along with the exemplary checkpoint and recovery technique of FIG. 1.

FIG. 2B illustrates an implementation of the error detection mechanism 16 of FIG. 2A, transforming unreliable code 32 to include the main instruction thread 28, the redundant shadow instruction thread 30, and error detection. The unreliable code 32 may be subject to SDCs as it does not include any mechanism to determine whether a transient fault has occurred during execution of the unreliable code 32. Error detection is facilitated through redundant execution of the unreliable code 32. In this manner, in addition to the main instruction thread 28 of the unreliable code 32, transformed code 34 includes the redundant shadow instruction thread 30 (indicated in FIG. 2B through use of *).

Thus, the transformed code 34 sequentially executes each operation of the main instruction thread 28 and a corresponding operation of the shadow instruction thread 30. At a memory store instruction 36, the error detection mechanism 16 is inserted in the transformed code 34. The error detection mechanism 16 compares result data of the main instruction thread 28 stored in a target memory address with corresponding shadow result data stored in a shadow register. Accordingly, if an SDC occurs during execution of the main instruction thread 28 or the shadow instruction thread 30, or if an SDC occurs during memory storage, the SDC is detected. By combining the error detection mechanism described in FIGS. 3A and 3B with the checkpoint and recover technique of FIG. 1, resilience can be achieved at fine granularity, such as the basic block level.

FIG. 3 is a schematic view of an exemplary basic instruction block incorporating the error detection mechanism 16 of FIGS. 2A and 2B, along with the exemplary checkpoint and recovery technique (e.g., InCheck 10) of FIG. 1. Generally, a basic instruction block is a straight-line code sequence with no branches in except to the entry and no branches out except at the exit. InCheck 10 may be invoked on a per-basic instruction block basis in order to provide a negligible recovery latency and resilience against control flow errors (e.g., errors branching into or out from the basic instruction block).

In this regard, an InCheck basic block 38 may include a basic instruction block 40 which has been transformed according to FIGS. 2A and 2B to include redundant execution (e.g., the redundant execution 14 of FIG. 1) through the main instruction thread 28 and the shadow instruction thread 30, as well as the error detection mechanism 16. The InCheck basic block 38 also includes the checkpointing 12 and the recovery mechanism 20 of FIG. 1.

The InCheck basic block 38 provides a method of detecting and recovering from soft errors (e.g., SDCs) of a processing device (e.g., during execution of an application, such as the application 24 of FIG. 2A). Before execution of the basic instruction block 40, register file preservation 42 is performed by storing an initial state of one or more registers at a preservation memory address. Memory preservation 44 is also performed through single memory-location checkpointing, backing up a target memory location that's about to be over-written to facilitate safe recovery. In this manner, prior to executing a store instruction to a target memory address, backup data stored in the target memory address is preserved in a memory backup register.

After the memory preservation 44 preserves the backup data, result data from the basic instruction block 40 is stored at the target memory address. The error detection mechanism 16 determines whether there is an error in the result data. For example, the error detection mechanism 16 can compare the result data of the main instruction thread 28 stored in the target memory address with corresponding shadow result data stored in a shadow register.

As described above with respect to FIG. 1, in addition to the error detection mechanism 16, the InCheck basic block 38 can also include the error diagnosis mechanism 18 to ensure safe error recovery. The error diagnosis mechanism 18 determines whether a detected error is recoverable (e.g., recovery is safe). If the error is recoverable, the recovery mechanism 20 performs a memory restore 46 to restore the backup data to the target memory address. The recovery mechanism 20 also performs a register file restore 48 to restore the initial state of the one or more registers and initiates re-execution of the basic instruction block 40.

The InCheck basic block 38 also includes a control flow error check 50 to detect and handle control flow errors (e.g., errors in instruction branches). The control flow error check 50 saves a program counter (PC) register at the beginning of the InCheck basic block 38 (e.g., after the register file preservation 42 and before execution of the basic instruction block 40). If a control flow error is detected (e.g., branching into the InCheck basic block 38 or out to another basic block), the control flow error check 50 restores the PC register and is able to roll the application back to the correct point of execution.

Figure 4A:
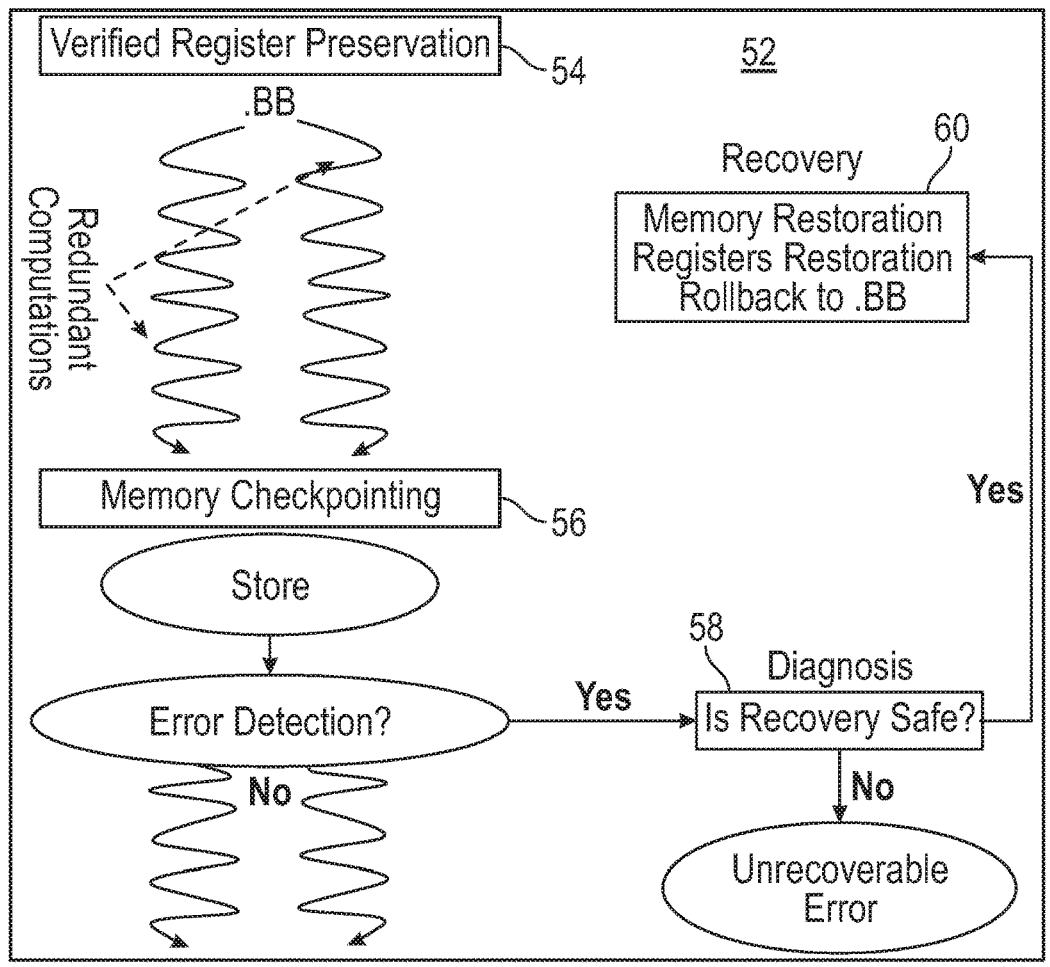
FIG. 4A is a schematic view of a data flow illustrating error detection, checkpoint, and recovery according to the exemplary basic instruction block of FIG. 3.

In further detail, FIG. 4A is a schematic view of a data flow 52 illustrating error detection, checkpoint, and recovery according to the exemplary basic instruction block of FIG. 3. The data flow 52 includes four main operations, as described further below. 1) Verified register preservation 54 takes place at the beginning of each InCheck basic block 38 (e.g., each critical basic block) and stores the value of live registers into the checkpointing area of memory. This ensures that no error can cross the preservation phase by checking the process of preservation itself in addition to checking the reserved registers' values. 2) Single memory-location checkpointing 56 preserves the data in an about-to-be-updated memory location to a specific register right before each store instruction. This register can further be used for memory restoration in the case of errors. 3) Check for safe recovery 58 checks if a detected error is recoverable. This is necessary because safe recovery is not possible in some cases. For instance, errors which cause a write into a memory location that is different from the one that the memory restore reads from cannot be recovered because the backup data is not valid. 4) Timely recovery 60 resumes application execution from the beginning of the InCheck basic block 38 after the restoration of the memory and registers. Timely recovery is possible since the overall operations needed for diagnosis and recovery are implemented within one hundred instructions.

1) Verified Register Preservation 54

At the entrance of each basic block, the values of live registers (e.g., the registers affected by the InCheck basic block 38) are saved into a designated memory location at one or more preservation memory addresses. Only error-free registers should be preserved, and the preservation process itself can be error-free to prevent failures. In this regard, the correctness of the preservation process is verified by applying checking-load strategy. The saved register value from the preservation memory address is loaded back and checked against a corresponding shadow register. Note that the PC register can always be considered as live and gets preserved. The PC register preservation facilitates recovery from control-flow errors detected in fan-in basic blocks that potentially contain multiple re-execution points.

2) Single Memory-Location Checkpointing 56

Rather than saving the entire memory state or relying on an application code's idempotent regions, the InCheck basic block 38 backs-up a memory location that is about to be overwritten to facilitate safe recovery. A memory subsystem can be protected by error-correcting code (ECC), thus saving an entire memory state may not be required. However, ECC is ineffective if erroneous data or an erroneous address is sent through a write command. Therefore, the previous value of an about-to-be-updated target memory address is needed for memory restoration.

In this regard, prior to a write instruction to the target memory address, a load instruction is inserted from the target memory address into a specific register, named the memory backup register (MBR). Thus, where InCheck is deployed in a compiler, the compiler breaks down basic blocks with potentially conflicting memory operations (e.g., multiple write and read operations from the same memory location) into sub basic blocks without such memory dependencies. This basic block purification may facilitate recovery from basic blocks with conflicting memory operations where the single memory-location checkpointing 56 provides backup for one memory location.

3) Check for Safe Recovery 58

One of the features that distinguishes the InCheck basic block 38 from traditional approaches is its diagnosis routine for safe recovery (e.g., the error diagnosis mechanism 18). Generally, if an error affects the redundant execution 14 of instructions or the error detection mechanism 16 of FIG. 1 (also illustrated in FIGS. 2A and 2B), the error is generally considered recoverable. However, if the error impacts the execution of a store instruction in such a way that the effective memory address gets modified, the error should be considered as unrecoverable since the data will be written into an unknown memory location. This is further illustrated with respect to FIG. 4B.

Figure 4B:
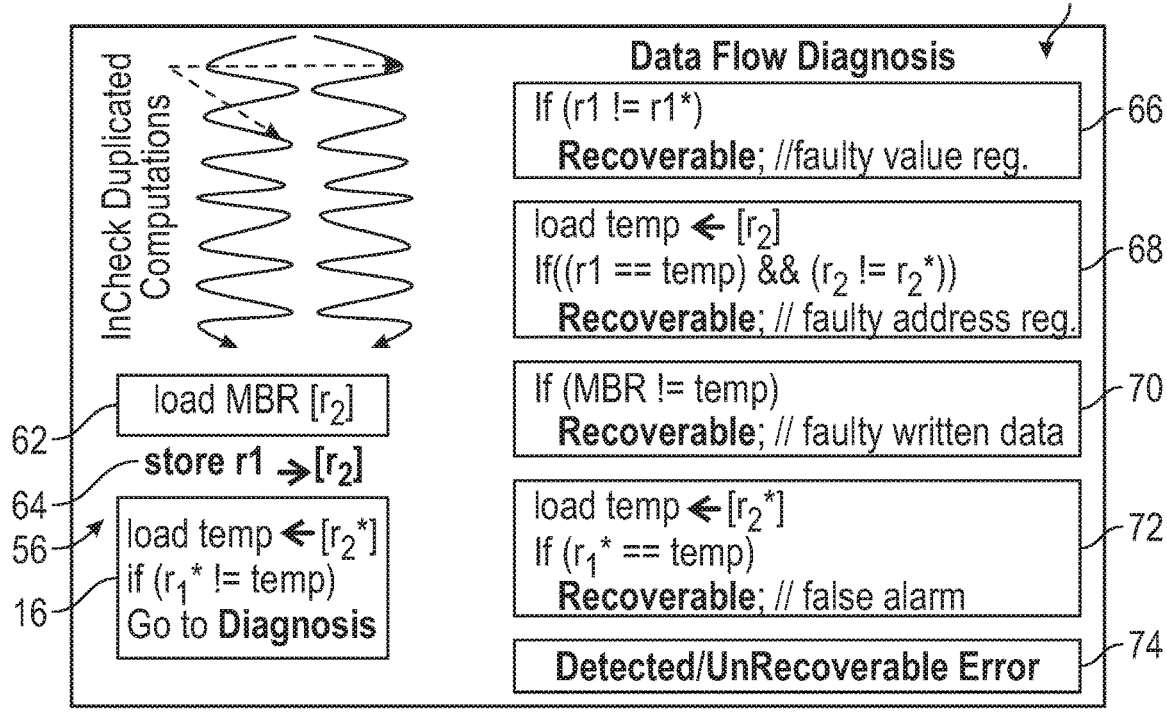
FIG. 4B is a schematic view of single memory-location checkpointing and a check for safe recovery of the data flow of FIG. 4A.

FIG. 4B is a schematic view of the single memory-location checkpointing 56 and the check for safe recovery 58 of the data flow 52 of FIG. 4A. The single memory-location checkpointing 56 begins with a load instruction 62 which preserves backup data in the target memory address in the MBR to provide on-demand memory checkpointing. The error detection mechanism 16 takes place after store instruction 64, and application control goes to the check for safe recovery 58 of FIG. 4A and the error diagnosis mechanism 18, in the case of a mismatch.

The error diagnosis mechanism 18 begins by checking for errors in the computation of store value register (r1) (block 66). If a mismatch is observed, the error is flagged to be recoverable. The application flow then jumps to the recovery routine (e.g., the timely recovery 60 of FIG. 4A, described further below).

Second, the error diagnosis mechanism 18 checks for mismatch from the store address register (block 68). Depending on the time of error occurrence, it may or may not be recoverable. If the error occurs on address register r2 before the load instruction 62, the error is flagged to be recoverable. In this case, the back-up for the wrongly updated memory is available and thus memory restoration is possible. However, if the error happens after the execution of the load instruction 62, the recovery is not possible since the value of the MBR is not the same as the previously updated wrong memory value. To determine the time of occurrence of the error, the error diagnosis mechanism 18 loads the data back from the target memory address into a temporary register (temp) and compares that against the store value register (r1). If they match, it assumes the error has modified the address of both the load instruction 62 and the store instruction 64 in the same way (e.g., the preservation is valid) and deems the error recoverable.

Third, the error diagnosis mechanism 18 compares the value of the MBR to temp (block 70). If these differ, it implies that the store instruction 64 has written incorrect data into the correct target memory location. This type of error is also recoverable because memory preservation is valid.

Fourth, the error diagnosis mechanism 18 checks for errors on detection instructions which are just false alarms and easily recoverable (block 72). False alarms can be checked by repeating the error detection mechanism 16 instructions. Ultimately, if none of the above situation were true, the error diagnosis mechanism 18 declares the error as detected/unrecoverable (block 74). This causes an unrecoverable error to be flagged, and may terminate and/or restart application execution, or may result in further handling by another routine.

4) Timely Recovery 60

Returning to FIG. 4A, if an error is detected and recoverable, the data flow 52 continues to the timely recovery 60 (e.g., the recovery mechanism 20 of FIGS. 1 and 3), including memory and register file restoration and re-executing the application from the beginning of the basic instruction block. First, the memory state is restored to the same state as before the write instruction (e.g., the store instruction 64 of FIG. 4B). This is done by writing the backup data in the MBR register into the target memory address (e.g., the store instruction 64's target location). Error-free live registers will then be loaded back from the preservation memory address(es) to the corresponding register(s). Finally, the application execution is rolled back to the beginning of the basic instruction block and resumed. Since the first two steps of InCheck (safe register preservation and memory checkpointing) should be executed in all (erroneous or error-free) cases, the recovery latency of InCheck is equal to the execution time of the diagnosis mechanism 18, the recovery mechanism 20, and replicated instructions (instructions from the beginning of basic-block till the error detection point). Since the diagnosis mechanism 18, the recovery mechanism 20, and the average basic block size are small, the overall recovery latency can be considered negligible.

Figure 5:
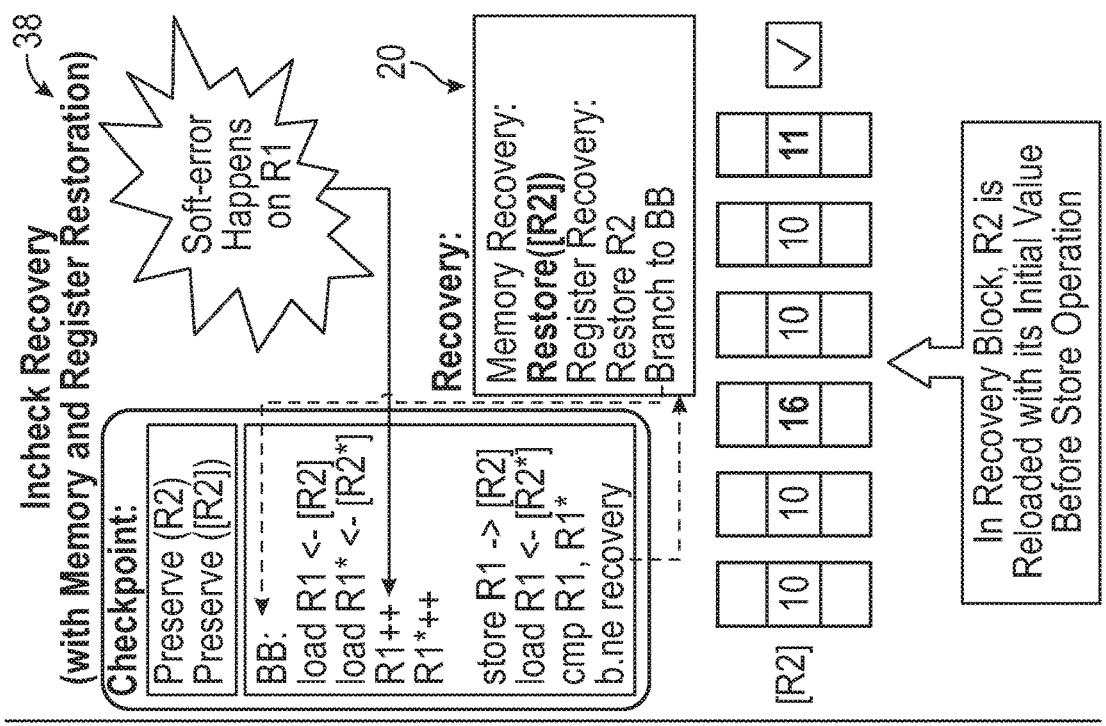
FIG. 5 is a schematic view of the checkpoint and recovery technique of the exemplary basic instruction block of FIG. 3, illustrating operation of memory and register restoration as compared with a register restoration only approach.
Figure 5:
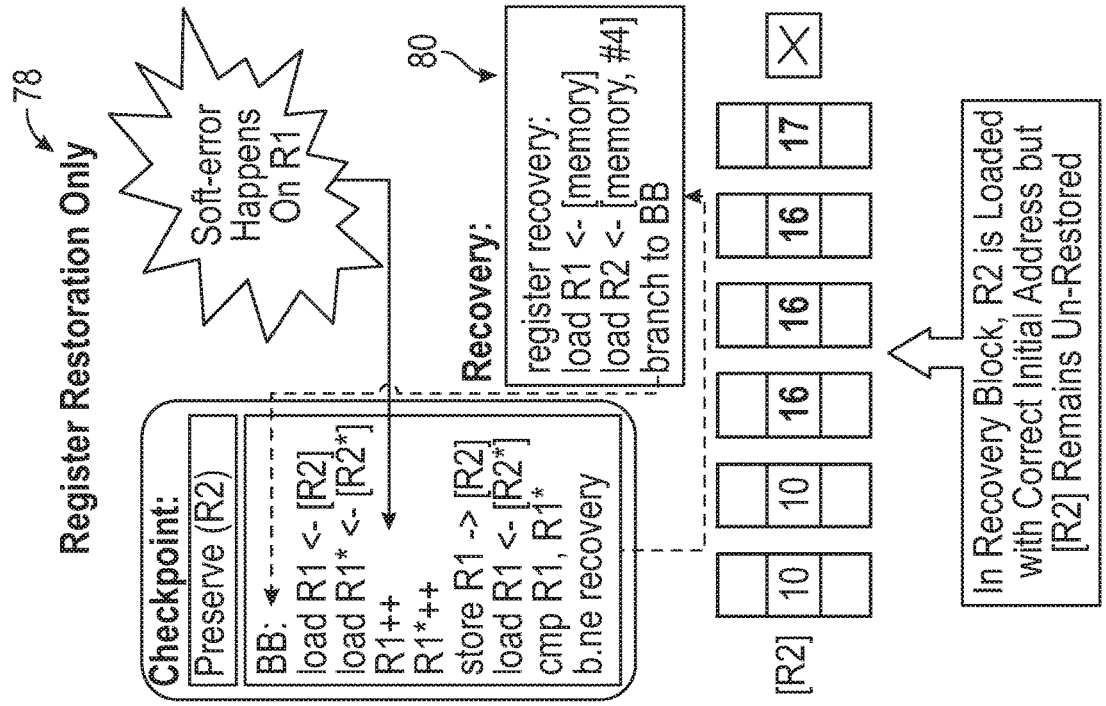

FIG. 5 is a schematic view of the checkpoint and recovery technique of the exemplary basic instruction block of FIG. 3, illustrating operation of memory and register restoration as compared with a register restoration only approach. An original program 76 is illustrated, along with the values stored at memory location [R2] at each step if no errors occur. In addition, a register restoration only approach 78 and the InCheck basic block 38 are illustrated having a soft error (e.g., SDC) occur at the same point on register R1.

With the register restoration only approach 78, the values of the registers are correctly preserved. However, the soft error changes the result data in the register R1, which is then stored at the memory location [R2]. When the error is detected, a recovery mechanism 80 properly restores the initial values of registers R1 and R2, but the value which was incorrectly stored in the memory location [R2] remains. Thus, during re-execution after the recovery mechanism 80, the value stored at the memory location [R2] will remain erroneous and will not be detected after the second execution.

In contrast, the InCheck basic block 38 preserves both the register values and the memory location [R2]. Thus, even though erroneous result data in the register R1 is initially stored in the memory location [R2], the recovery mechanism 20 properly restores both the values of the registers R1 and R2 and the value in the memory location [R2]. Thus, during re-execution after the recovery mechanism 20, the value stored at the memory location [R2] is correct and the error does not recur.

Figure 6:
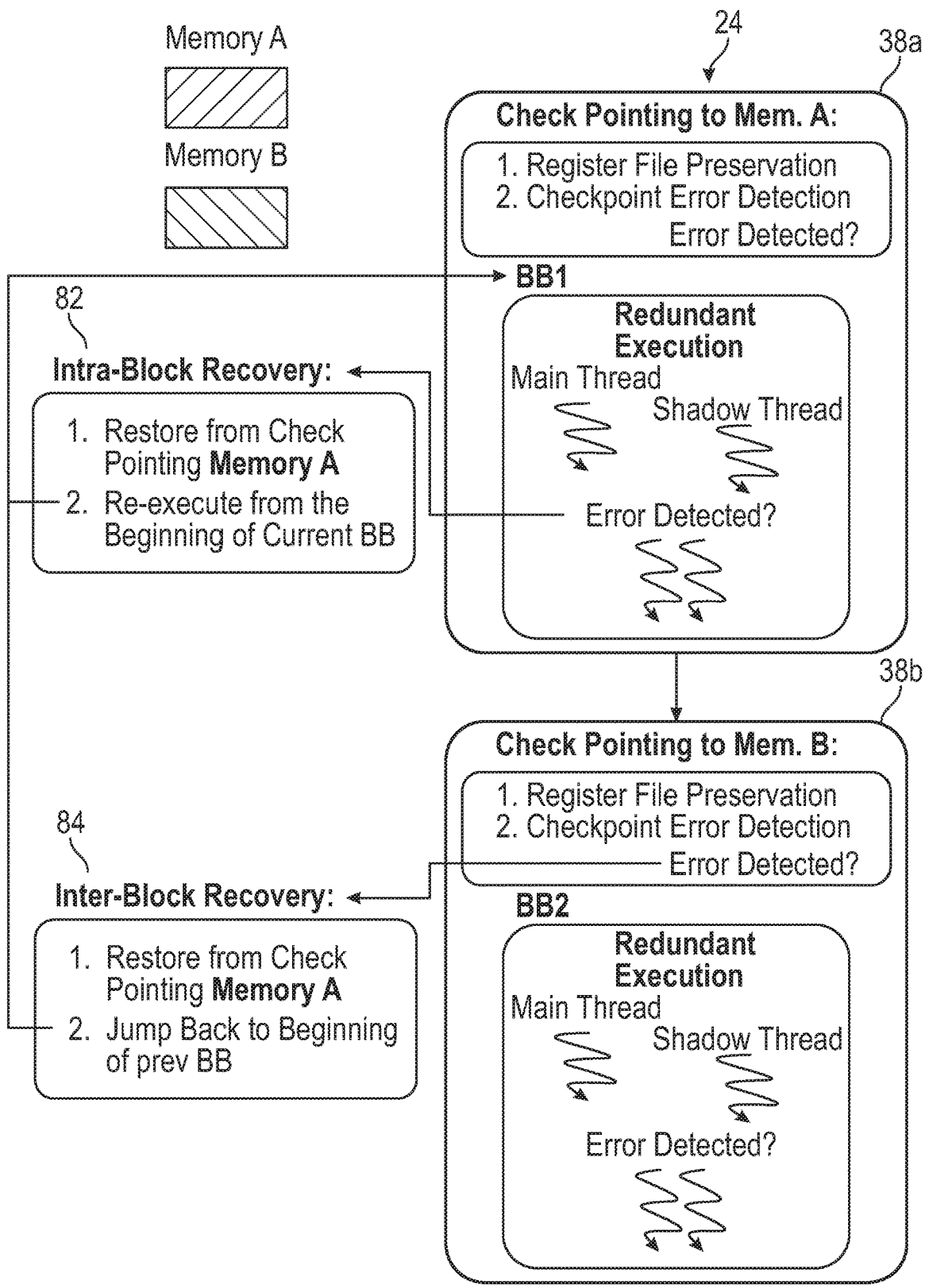
FIG. 6 is a schematic view of sequential basic instruction blocks according to FIG. 3, providing a two phase checkpointing technique.

FIG. 6 is a schematic view of sequential basic instruction blocks according to FIG. 3, providing a two phase checkpointing technique. In an exemplary aspect, multiple InCheck basic blocks 38a, 38b can be provided in an application 24. In such cases, the two phase checkpointing technique may be implemented to provide intra-block recovery 82 and inter-block recovery 84. For example, a first InCheck basic block 38a can provide checkpointing to a first memory location A, while a second InCheck basic block 38b provides checkpointing to a second memory location B.

An error may be detected in the first InCheck basic block 38a as a result of the redundant execution or memory storage. This triggers the intra-block recovery 82, restoring from the first memory location A and re-executing the first basic block at BB1. In the subsequent second InCheck basic block 38b, an error may be detected during checkpointing (e.g., during register preservation). This triggers the inter-block recovery 84, restoring from the first memory location A (rather than the second memory location B) and re-executing the first InCheck basic block 38a at BB1.

Figure 7:
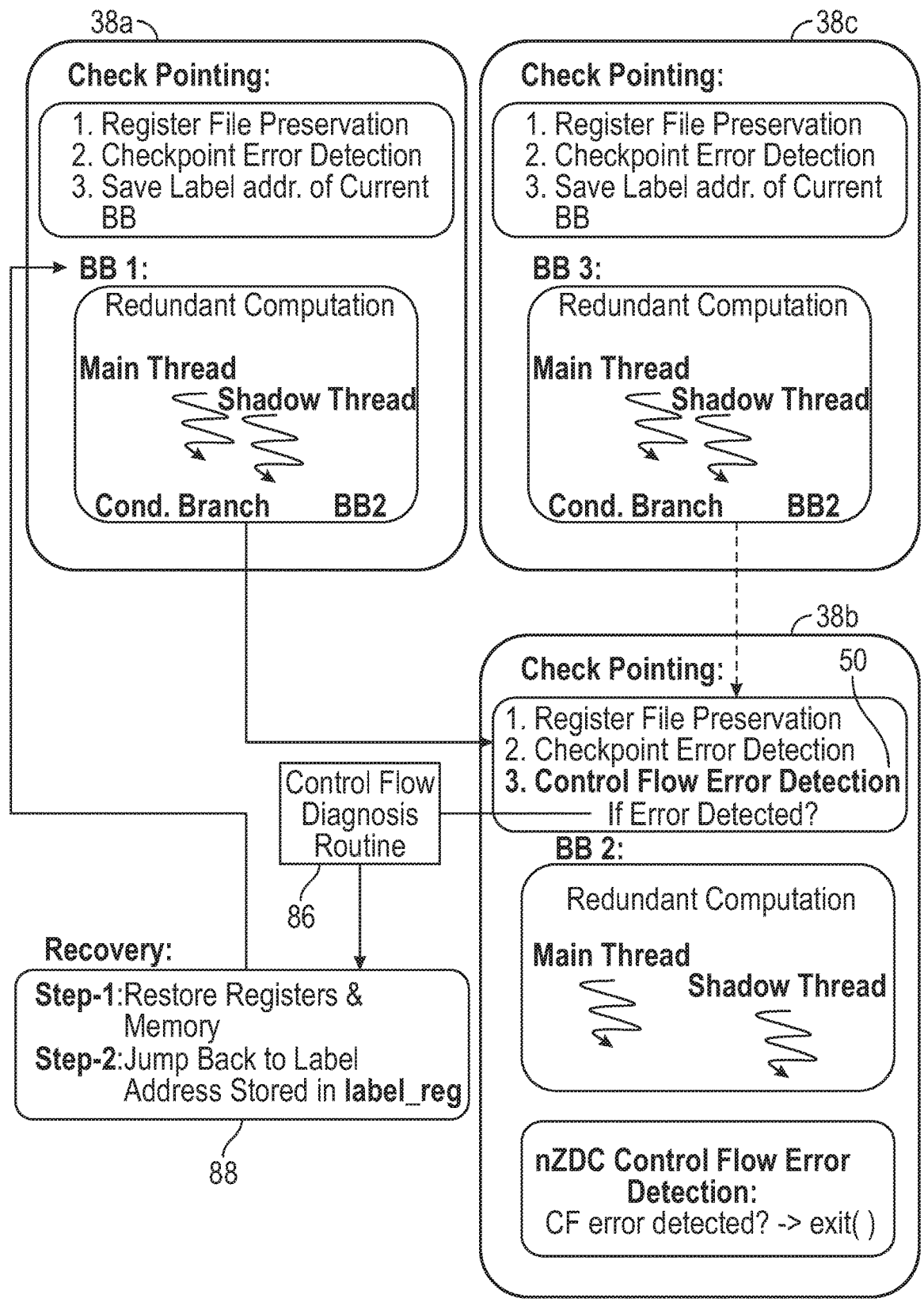
FIG. 7 is a schematic view of a control flow illustrating error detection, checkpoint, and recovery for control flow errors in the exemplary basic instruction block of FIG. 3.

FIG. 7 is a schematic view of a control flow illustrating error detection, checkpoint, and recovery for control flow errors in the exemplary basic instruction block of FIG. 3. Each InCheck basic block 38a, 38b, 38c employs control flow checking in the error detection mechanism 18, which may be positioned close to the end of each basic block to ensure a branch out from a first InCheck basic block 38a properly exits to its next basic instruction block (e.g., a second InCheck basic block 38b). In addition, a control flow error check 50 is performed at the beginning of the second InCheck basic block 38b (e.g., before safe register preservation). If a control flow error gets detected, a control flow diagnosis routine 86 is invoked. Control-flow error recovery 88 is similar to the data flow error recovery described above with respect to FIG. 4A; however, the challenge is to determine from where the application re-execution should be restarted.

Accordingly, the control flow diagnosis routine 86 is different from the error diagnosis mechanism 18 (described above with respect to FIG. 4B), and it determines if the detected control flow error is a wrong-direction error (errors which alter the direction of branch) or a wrong-target error (errors which cause an illegal jump). A control-flow error will be considered as a wrong-direction error if the last preserved PC register value is in the list of predecessors of the current basic block (which may also include a third InCheck basic block 38c). If that is the case, the error will be treated as recoverable and the control flow error recovery 88 takes place by restoring memory and register values to the initial state of the previously executed InCheck basic block 38a. The application execution also returns to the label address stored in a label registry label_reg by the first InCheck basic block 38a. Otherwise, the error will be considered a wrong-target control flow error, and is generally considered unrecoverable. An unrecoverable control flow error may be handled similar to unrecoverable data flow errors, such as by terminating and/or restarting the application. Fortunately, most control flow errors are wrong-direction errors and are therefore recoverable.

Figure 8:
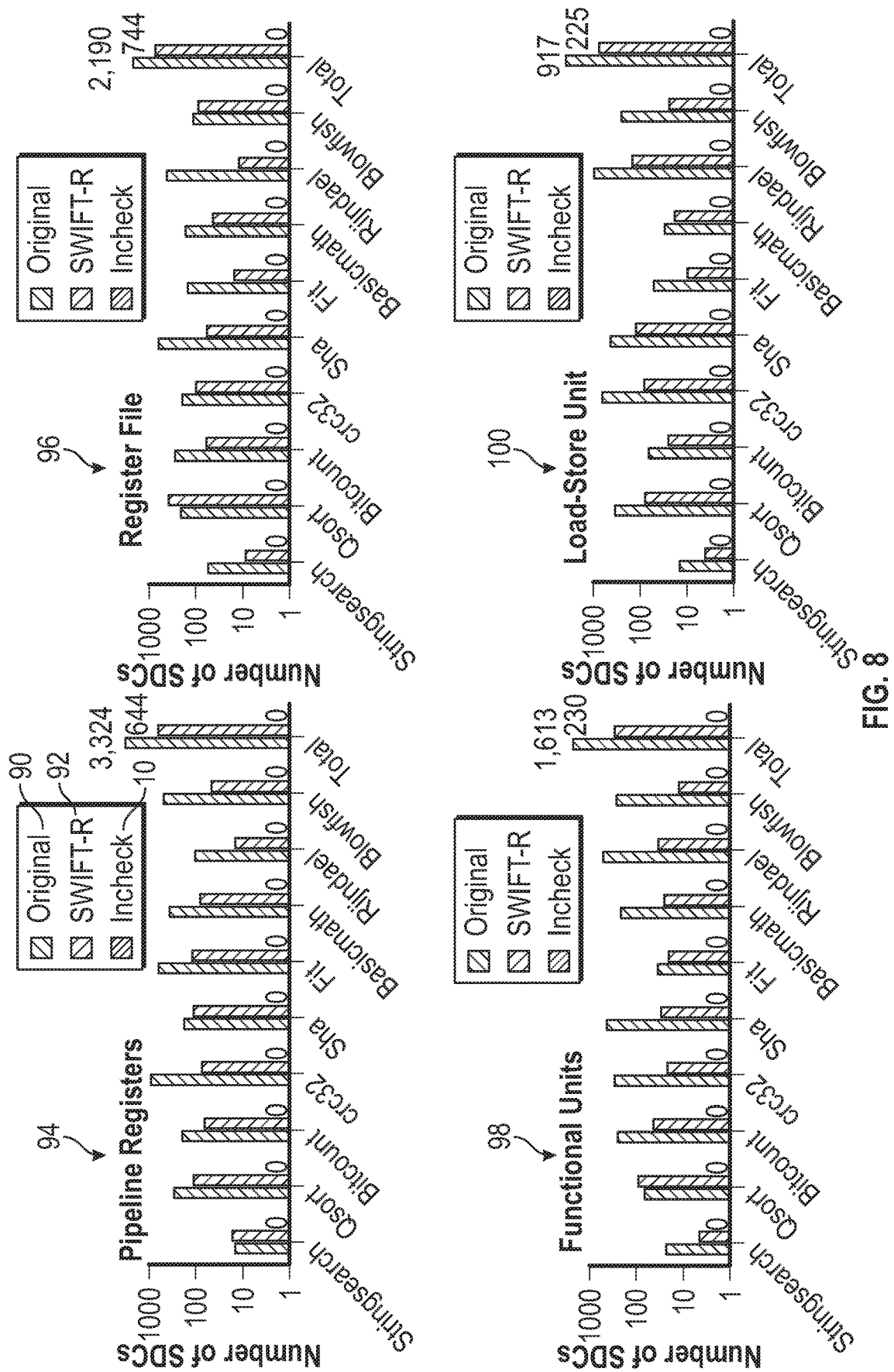
FIG. 8 illustrates tabular views of failures occurring on an original application without any error recovery, with SWIFT-ft and with the InCheck checkpoint and recovery technique.
Figure 9:
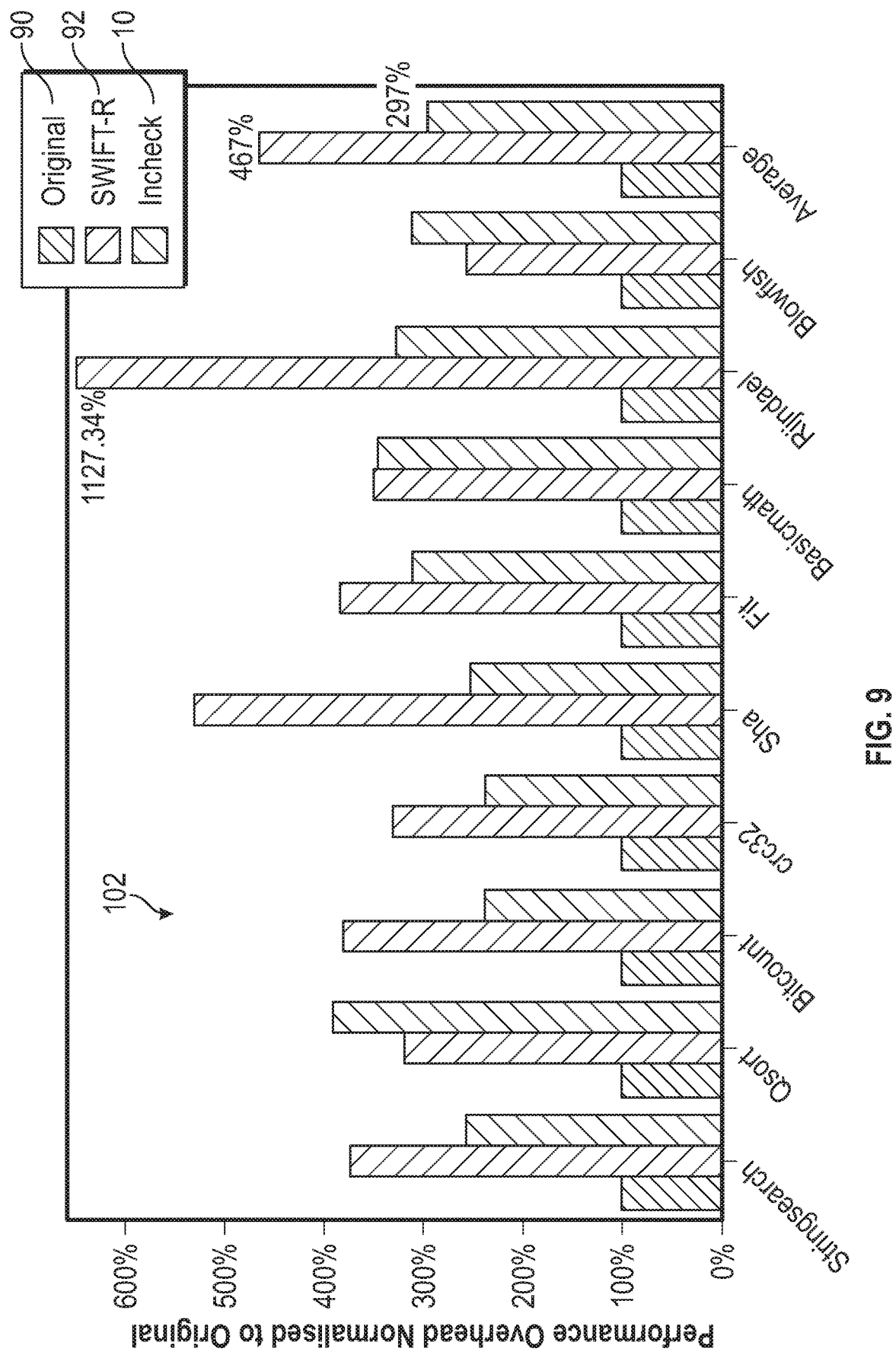
FIG. 9 illustrates a tabular view of performance overhead in the original application, with SWIFT-ft and with InCheck.

FIGS. 8 and 9 illustrate results of a simulation of the InCheck 10 checkpoint and recovery technique compared with a prior approach named SWIFT-R 92 (described in Reis et. al. Automatic instruction-level software-only recovery. MICRO, 2007), and an unprotected original application 90. To quantify the effectiveness of InCheck 10, the original application 90, SWIFT-R 92, and InCheck 10 were implemented on test hardware components. Nine applications were compiled from a benchmark suite, with three versions being compiled for each (original 90, InCheck 10, and SWIFT-R 92) were produced. Extensive fault injection experiments were performed on all major sequential hardware components of a microprocessor. Single bit-flip fault injection experiments were performed on major core components including issue and decode pipeline registers 94, an integer register file 96, functional units 98, and load-store unit buffer registers 100.

For each component, 2000 faults were injected per version of each application, which means 72,000 (4*2000*9) faults per each approach—overall 216,000 (72 k*3) faults. For each fault injection experiment, a target component and a (bit, cycle) were randomly selected before the simulation run. Once the simulator reached the target fault injection cycle, simulation was paused and the selected bit was inverted. The simulation then resumed with the faulty value until it was terminated or reached the allowed simulation time (3x of normal execution time).

The result of each simulation run is classified as one of the following: 1) Masked: Application terminated normally and the output is correct. 2) Failed/SDC: Application terminated, but the output was incorrect. 3) Detected/Unrecoverable: This outcome occurred only in InCheck 10 protected applications, and happened when an error was detected, but could not be recovered from. 4) Others: Application encountered a fatal error, such as segmentation fault or simulation time reaches its limit.

FIG. 8 illustrates tabular views of failures occurring on the original application 90 without any error recovery, with SWIFT-R 92, and with the InCheck 10 checkpoint and recovery technique. FIG. 8 depicts the absolute number (in logarithmic scale) of failures (SDCs) per hardware component. As illustrated, regardless of the target fault injection component, applications protected by InCheck 10 never resulted in a failure. This implies that: 1) no error could skip the error detection mechanism 16 of InCheck 10, 2) the error diagnosis mechanism 18 always distinguishes recoverable errors from unrecoverable ones accurately, and 3) if the detected error was recognized as recoverable, the recovery mechanism 20 is always successful. InCheck 10 is very effective as it protects functionally-related instructions of the application as well as error handling (preservation and checkpointing) operations.

However, in comparison to the original application 90, SWIFT-R 92 transformation reduces the overall failure count by 4.3x (5.2x, 2.9x, 8x, and 4x for pipeline registers, register file, functional units and load-store unit, respectively). An investigation from failed experiments reveals that, unlike InCheck 10, SWIFT-R 92 provides safe recovery only from the faults which affect the computational instructions, and the rest of the faults either get masked by the applications or lead to failures or segmentation faults.

Applications protected by InCheck 10 can potentially recover from soft errors which lead to segmentation faults if the error diagnosis mechanism 18 initializes at the beginning of signal handler functions of applications. The error diagnosis mechanism 18 of InCheck 10 declared around 96% of detected faults as recoverable. In the less than 4% of errors which were unrecoverable, the error diagnosis mechanism 18 provided safe-stop and prevented failure by terminating the application. If left unterminated, these unrecoverable faults could have either directly impacted the execution of a memory write operation or caused an unexpected jump in the application. Restarting and other strategies can be employed to recover in these scenarios with limited impact on overall application performance given their rarity.

FIG. 9 illustrates a tabular view of performance overhead 102 in the original application 90, with SWIFT-R 92, and with InCheck 10. The performance overhead 102 of SWIFT-R 92 and InCheck 10 are shown normalized to the original application 90. It can be seen that on average, an InCheck 10 version of an application can run 36% faster than its SWIFT-R 92 equivalent. InCheck 10 is faster because it pushes the uncommon diagnosis and recovery routines off the critical-path of execution. The performance overhead of frequent live register preservation is acceptable, because the corresponding memory preservation locations are usually presented in the cache and will therefore execute quickly. Furthermore, the performance overhead of memory preservation (inserted right before memory store instructions) are also not significant, because they do not cause additional memory misses—if the data is not in the cache, a miss is inevitable. If not by memory preservation, it will eventually happen by the store instruction itself.

To quantify the recovery latency of InCheck 10, the average number of extra instructions resulting from the detection and recovery of an injected fault was counted. On average, the InCheck 10 recovery spans one hundred eighty dynamic instructions. This latency is unnoticeable in most cases.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller circuit may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

Those skilled in the art will recognize improvements and modifications to the preferred embodiments of the present disclosure. All such improvements and modifications are considered within the scope of the concepts disclosed herein and the claims that follow.

What is claimed is:

1. A method of detecting and recovering from soft errors of a processing device, comprising:
    storing an initial state of a first register at a preservation memory address;
    executing an instruction block comprising a store instruction at a target memory address;
    before executing the instruction block, determining whether a control flow error occurred in a previous instruction;
    if the control flow error occurred, executing a control flow diagnosis routine;
    prior to executing the store instruction, preserving backup data stored in the target memory address in a memory backup register;
    after preserving the backup data, storing result data from the instruction block at the target memory address;
    detecting an error in the result data; and
    in response to detecting the error, recovering from the error.

2. The method of claim 1, further comprising:
    identifying a set of registers used in the instruction block; and
    storing an initial state of each of the set of registers at a corresponding preservation memory address of a set of preservation memory addresses.

3. The method of claim 2, wherein recovering from the error comprises:
    restoring the backup data to the target memory address; and
    restoring the initial state of each of the set of registers.

4. The method of claim 3, wherein recovering from the error further comprises re-executing the instruction block.

5. The method of claim 1, further comprising:
determining whether the error is recoverable; and
if the error is recoverable, restoring the initial state of the first register and restoring the backup data to the target memory address.

6. The method of claim 5, wherein determining whether the error is recoverable comprises determining the error is recoverable if the result data was stored in the target memory address.

7. The method of claim 5, further comprising if the error is not recoverable, flagging an unrecoverable error.

8. The method of claim 1, further comprising verifying the initial state of the first register has been accurately preserved before executing the instruction block.

9. The method of claim 1, wherein executing the instruction block comprises performing a main instruction thread using a main set of registers and a redundant shadow instruction thread using a shadow set of registers.

10. The method of claim 9, further comprising comparing the result data stored at the target memory address with shadow result data in a corresponding register of the shadow set of registers.

11. The method of claim 9, further comprising verifying the initial state of the first register has been accurately preserved before executing the instruction block by:
loading from the preservation memory address into the first register; and
comparing the first register with a corresponding register of the shadow set of registers.

12. The method of claim 1, wherein the control flow diagnosis routine comprises:
determining whether the control flow error is a wrong direction error; and
if the control flow error is the wrong direction error, restoring previously stored program counter data to a program counter register.

* * * * *